(12) United States Patent
Nawata et al.

(10) Patent No.: US 8,983,699 B2
(45) Date of Patent: Mar. 17, 2015

(54) VEHICLE, METHOD AND DEVICE FOR CONTROLLING VEHICLE

(75) Inventors: Hidekazu Nawata, Susono (JP); Shunsuke Fushiki, Susono (JP); Makoto Yamazaki, Gotenba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/977,775

(22) PCT Filed: Feb. 1, 2011

(86) PCT No.: PCT/JP2011/051980
§ 371 (c)(1),
(2), (4) Date: Jul. 1, 2013

(87) PCT Pub. No.: WO2012/104984
PCT Pub. Date: Aug. 9, 2012

(65) Prior Publication Data
US 2013/0304291 A1    Nov. 14, 2013

(51) Int. Cl.
*B60W 20/00*       (2006.01)
*B60K 6/445*       (2007.10)
*B60W 10/06*       (2006.01)
*B60W 10/30*       (2006.01)

(52) U.S. Cl.
CPC ............. *B60W 20/00* (2013.01); *B60K 6/445* (2013.01); *B60W 10/06* (2013.01); *B60W 10/30* (2013.01); *B60W 20/1082* (2013.01); *B60W 2710/0694* (2013.01); *B60W 2600/00* (2013.01); *Y10S 903/93* (2013.01); *Y02T 10/6239* (2013.01); *Y02T 10/54* (2013.01)
USPC ............................................ 701/22; 903/930

(58) Field of Classification Search
USPC ........................................................ 701/22
See application file for complete search history.

(56) References Cited

U.S. PATENT DOCUMENTS

| | | | |
|---|---|---|---|
| 6,427,793 B1 | 8/2002 | Hanada et al. | |
| 7,792,627 B1 | 9/2010 | Santoso et al. | |
| 7,997,252 B2* | 8/2011 | Pursifull et al. | 123/406.12 |
| 2010/0038158 A1* | 2/2010 | Whitney et al. | 180/65.265 |
| 2010/0063662 A1 | 3/2010 | Harada et al. | |
| 2010/0108032 A1* | 5/2010 | Pursifull et al. | 123/406.12 |
| 2010/0235070 A1* | 9/2010 | Amano | 701/103 |
| 2011/0288713 A1* | 11/2011 | Pursifull et al. | 701/22 |
| 2013/0024063 A1* | 1/2013 | Yamamoto et al. | 701/22 |
| 2013/0025263 A1* | 1/2013 | Amano | 60/285 |

FOREIGN PATENT DOCUMENTS

| | | |
|---|---|---|
| CN | 101865012 A | 10/2010 |
| JP | 2001-115869 A | 4/2001 |
| JP | 2009-127512 A | 6/2009 |
| JP | 2009-286374 A | 12/2009 |
| JP | 2010-058746 A | 3/2010 |

* cited by examiner

*Primary Examiner* — Thomas Tarcza
*Assistant Examiner* — Alex C Dunn
(74) *Attorney, Agent, or Firm* — Sughrue Mion, PLLC

(57) ABSTRACT

A vehicle provided with a motor generator as a driving source includes an engine and a catalyst for purifying gas exhausted from the engine. The engine is controlled in one control mode of a CS mode and a CD mode in which opportunity for operation of the engine is limited compared to in the CS mode. In the CS mode, the temperature of the catalyst is increased to be equal to or higher than a prescribed activating temperature. The temperature of the catalyst is increased to be higher than the activating temperature before the control mode is changed from the CS mode to the CD mode.

6 Claims, 8 Drawing Sheets

F I G. 2
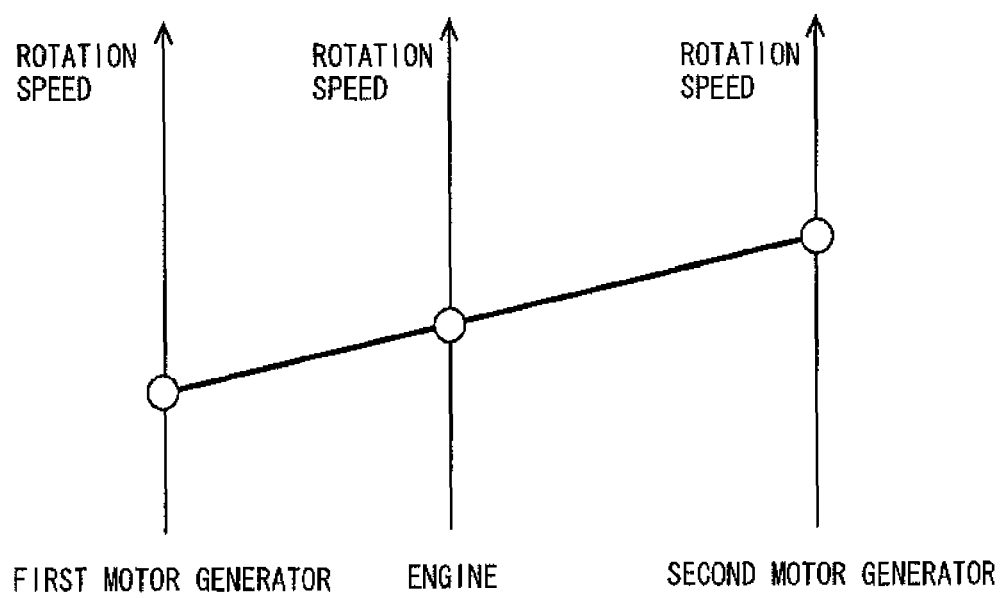

F I G. 7
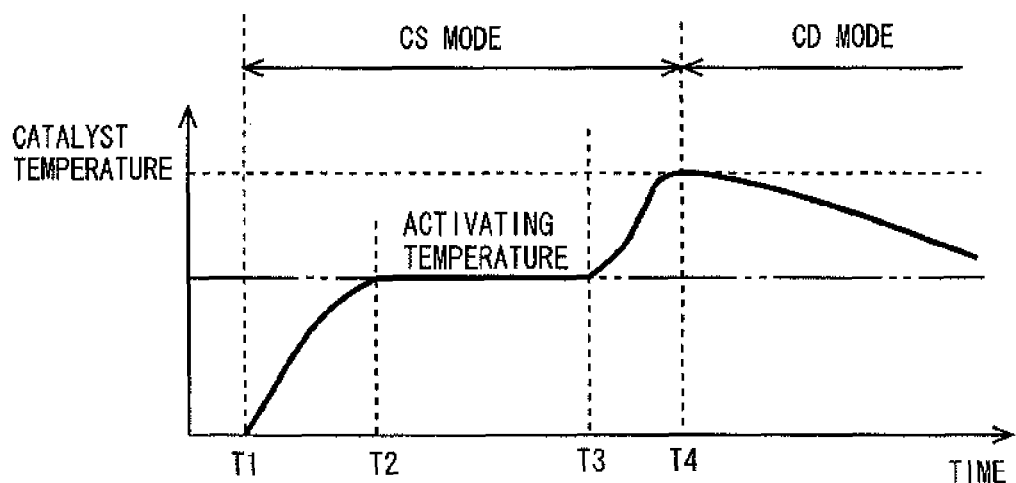

VEHICLE, METHOD AND DEVICE FOR CONTROLLING VEHICLE

CROSS REFERENCE TO RELATED APPLICATIONS

This application is a National Stage of International Application No. PCT/JP2011/051980 filed Feb. 1, 2011, the contents of all of which are incorporated herein by reference in their entirety.

TECHNICAL FIELD

The present invention relates to a vehicle, a method and a device for controlling the vehicle, and more particularly to a technique for increasing the temperature of a catalyst for purifying gas exhausted from an engine.

BACKGROUND ART

A hybrid vehicle incorporating an engine and an electric motor as a driving source is known. The hybrid vehicle has a power storage device such as a battery for storing electric power to be supplied to the electric motor. The battery is charged with electric power generated by a power generator driven by the engine, electric power regenerated with the electric motor during deceleration of the vehicle, and the like.

Such a hybrid vehicle can run using either one or both of the engine and the electric motor as a driving source, depending on an operating state and the like of the vehicle. Thus, for example, when an accelerator pedal position is small, the engine is stopped, and the vehicle can run using only the electric motor as a driving source. When sudden acceleration is required, on the other hand, the engine is driven in order to obtain desired acceleration.

A running state in which the engine is stopped and only the electric motor is used as a driving source involves no exhaust gas emissions, thus imposing only a small environmental load. In a hybrid vehicle, however, stopping and starting of an engine may be repeated as described above. As a result, the engine may be stopped before the completion of warm-up. Therefore, the engine may be frequently re-started with the warm-up uncompleted. As is well known, when an engine is started before the completion of warm-up, a relatively large amount of HC or CO may be exhausted.

In view of this problem, Japanese Patent Laying-Open No. 2010-58746 (PTL1) discloses, in claim 3 and the like, that where the temperature of the catalyst is lower than a prescribed value, even though a request for electric running to stop the internal combustion engine and use mechanical power of the rotating electric machine is made, the request for electric running is not permitted.

CITATION LIST

Patent Literature

PTL 1: Japanese Patent Laying-Open No. 2010-58746

SUMMARY OF INVENTION

Technical Problem

However, even if the engine is stopped when the temperature of the catalyst is a prescribed activating temperature, the temperature of the catalyst may decrease while the engine is being stopped, and may become lower than the activating temperature.

An object of the present invention is to maintain a state in which a catalyst is warmed-up.

Solution to Problem

A vehicle provided with an electric motor as a driving source includes an engine, a catalyst that purifies gas exhausted from the engine, and a control unit. The control unit controls the engine in one of a first control mode and a second control mode in which opportunity for operation of the engine is limited compared to in the first control mode. In the first control mode, the temperature of the catalyst is increased to be equal to or higher than a prescribed temperature. The temperature of the catalyst is increased to be higher than the prescribed temperature before the control mode is changed from the first control mode to the second control mode.

Advantageous Effects of Invention

The temperature of the catalyst is increased to be higher than the prescribed temperature before transfer from the first control mode to the second control mode. Therefore, even in the second control mode in which the temperature of the catalyst easily decreases due to limited operation of the engine, the temperature of the catalyst can be maintained higher than the prescribed temperature for a long period of time. Thus, the state in which the catalyst is warmed-up is maintained.

BRIEF DESCRIPTION OF DRAWINGS

FIG. 2 is a nomographic chart of a power split device.

FIG. 7 is a timing chart illustrating rotation speeds of the engine.

DESCRIPTION OF EMBODIMENTS

Figure 1:
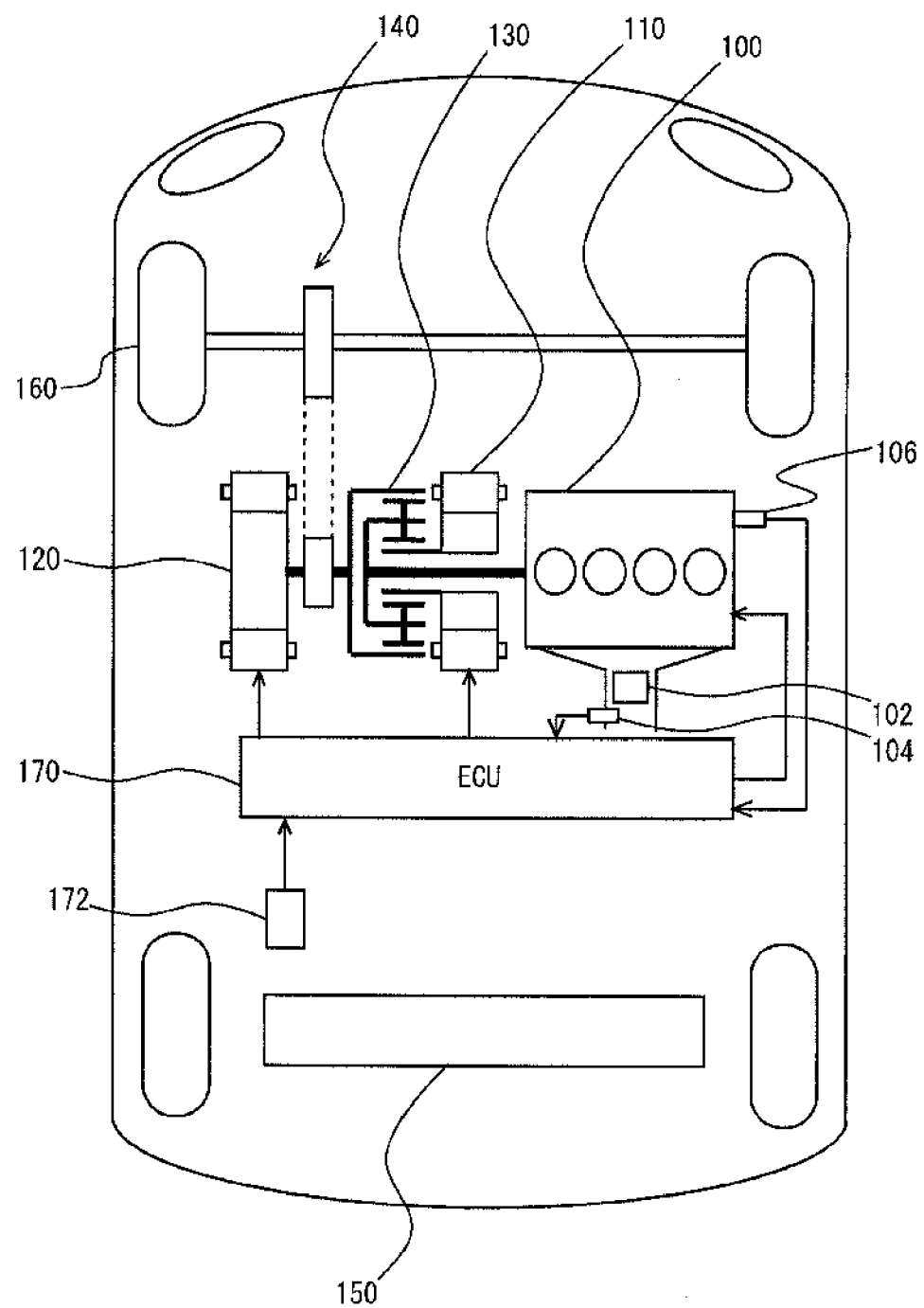
FIG. 1 is a schematic structural diagram illustrating a plug-in hybrid vehicle.

The embodiments of the present invention will be hereinafter described referring to the drawings, in which the same components are designated by the same reference characters. Names and functions thereof are the same, and therefore, description thereof will not be repeated.

Referring to FIG. 1, a plug-in hybrid vehicle includes an engine 100, a first motor generator 110, a second motor generator 120, a power split device 130, a reduction gear 140, and a battery 150. While a plug-in hybrid vehicle will be described below by way of example, a hybrid vehicle without the function of being charged by an external power supply may be used instead of the plug-in hybrid vehicle.

Engine 100, first motor generator 110, second motor generator 120, and battery 150 are controlled by an ECU (Electronic Control Unit) 170. ECU 170 may be divided into a plurality of ECUs.

This vehicle runs with a driving force from at least one of engine 100 and second motor generator 120. That is, either one or both of engine 100 and second motor generator 120 are automatically selected as a driving force, depending on an operating state.

When an accelerator pedal position is small and when vehicle speed is low, for example, the plug-in hybrid vehicle runs with only second motor generator 120 as a driving source. In this case, engine 100 is stopped. Engine 100, however, may be driven for power generation or the like.

When the accelerator pedal position is great, when the vehicle speed is high, and when a state of charge (SOC) of battery 150 is low, for example, engine 100 is driven. In this case, the plug-in hybrid vehicle runs with only engine 100, or both of engine 100 and second motor generator 120, as a driving source.

Engine 100 may be used not as a driving source for running, but only for power generation. That is, the hybrid vehicle may be a series hybrid vehicle.

Further, this vehicle is controlled either in a CS (Charge Sustaining) mode or in a CD (Charge Depleting) mode as a control mode. The control mode may be manually selected by a driver operating a switch 172. The control mode may be automatically switched between the CS mode and the CD mode.

In the CS mode, the plug-in hybrid vehicle runs while maintaining electric power stored in battery 150 at a prescribed target value.

In the CD mode, the plug-in hybrid vehicle runs with electric power mainly only by a driving force from second motor generator 120, without maintaining the electric power stored in battery 150 for running. In the CD mode, however, when the accelerator pedal position is great and when the vehicle speed is high, for example, engine 100 may be driven to supplement the driving force.

The CS mode may also be referred to as HV mode. Likewise, the CD mode may also be referred to as EV mode. The CS mode and the CD mode will be described later in further detail.

Engine 100 is an internal combustion engine. A crankshaft serving as an output shaft rotates by combustion of an air-fuel mixture in a combustion chamber. Exhaust gas exhausted from engine 100 is purified by a catalyst 102, and then exhausted outside the vehicle. Catalyst 102 performs the purifying function by being increased in temperature to a prescribed activating temperature. Warm-up of catalyst 102 is performed with the heat of exhaust gas. Catalyst 102 is a three-way catalyst, for example.

From the exhaust gas, an air-fuel ratio of engine 100 is detected by an air-fuel ratio sensor 104. The temperature of coolant of engine 100 is detected by a temperature sensor 106. An output from air-fuel ratio sensor 104 and an output from temperature sensor 106 are input to ECU 170.

Engine 100, first motor generator 110 and second motor generator 120 are connected to one another via power split device 130. Mechanical power generated by engine 100 is split for two paths by power split device 130. One of them is a path for driving front wheels 160 via reduction gear 140. The other is a path for driving first motor generator 110 to generate power.

First motor generator 110 is a three-phase alternating-current rotating electric machine including a U-phase coil, a V-phase coil and a W-phase coil. First motor generator 110 generates power from mechanical power generated by engine 100 and split by power split device 130. The electric power generated by first motor generator 110 is used depending on a running state of the vehicle, and a state of charge of battery 150. For example, during normal running, the electric power generated by first motor generator 110 is used directly as electric power for driving second motor generator 120. On the other hand, when the SOC of battery 150 is lower than a predetermined value, the electric power generated by first motor generator 110 is converted from alternating-current power to direct-current power by an inverter described later. Then, the electric power is adjusted in voltage by a converter described later, and stored in battery 150.

When first motor generator 110 acts as a power generator, first motor generator 110 generates negative torque. The negative torque as used herein refers to torque that will serve as a load on engine 100. When first motor generator 110 acts as a motor with electric power supplied from first motor generator 110, first motor generator 110 generates positive torque. The positive torque as used herein refers to torque that will not serve as a load on engine 100, i.e., torque that will assist the rotation of engine 100. The same applies to second motor generator 120.

Second motor generator 120 is a three-phase alternating-current rotating electric machine including a U-phase coil, a V-phase coil and a W-phase coil. Second motor generator 120 is driven by at least one of the electric power stored in battery 150 and the electric power generated by first motor generator 110.

A driving force from second motor generator 120 is transmitted to front wheels 160 via reduction gear 140. Second motor generator 120 thus assists engine 100, and causes the vehicle to run by the driving force from second motor generator 120. Rear wheels may be driven instead of or in addition to front wheels 160.

During regenerative braking of the plug-in hybrid vehicle, second motor generator 120 is driven by front wheels 160 via reduction gear 140, and second motor generator 120 operates as a power generator. Second motor generator 120 thus operates as a regenerative brake for converting braking energy to electric power. The electric power generated by second motor generator 120 is stored in battery 150.

Power split device 130 is formed of a planetary gear including a sun gear, a pinion gear, a carrier, and a ring gear. The pinion gear engages with the sun gear and the ring gear. The carrier supports the pinion gear in such a manner that allows rotation of the pinion gear. The sun gear is coupled to a rotating shaft of first motor generator 110. The carrier is coupled to the crankshaft of engine 100. The ring gear is coupled to a rotating shaft of second motor generator 120 and reduction gear 140.

Figure 3:
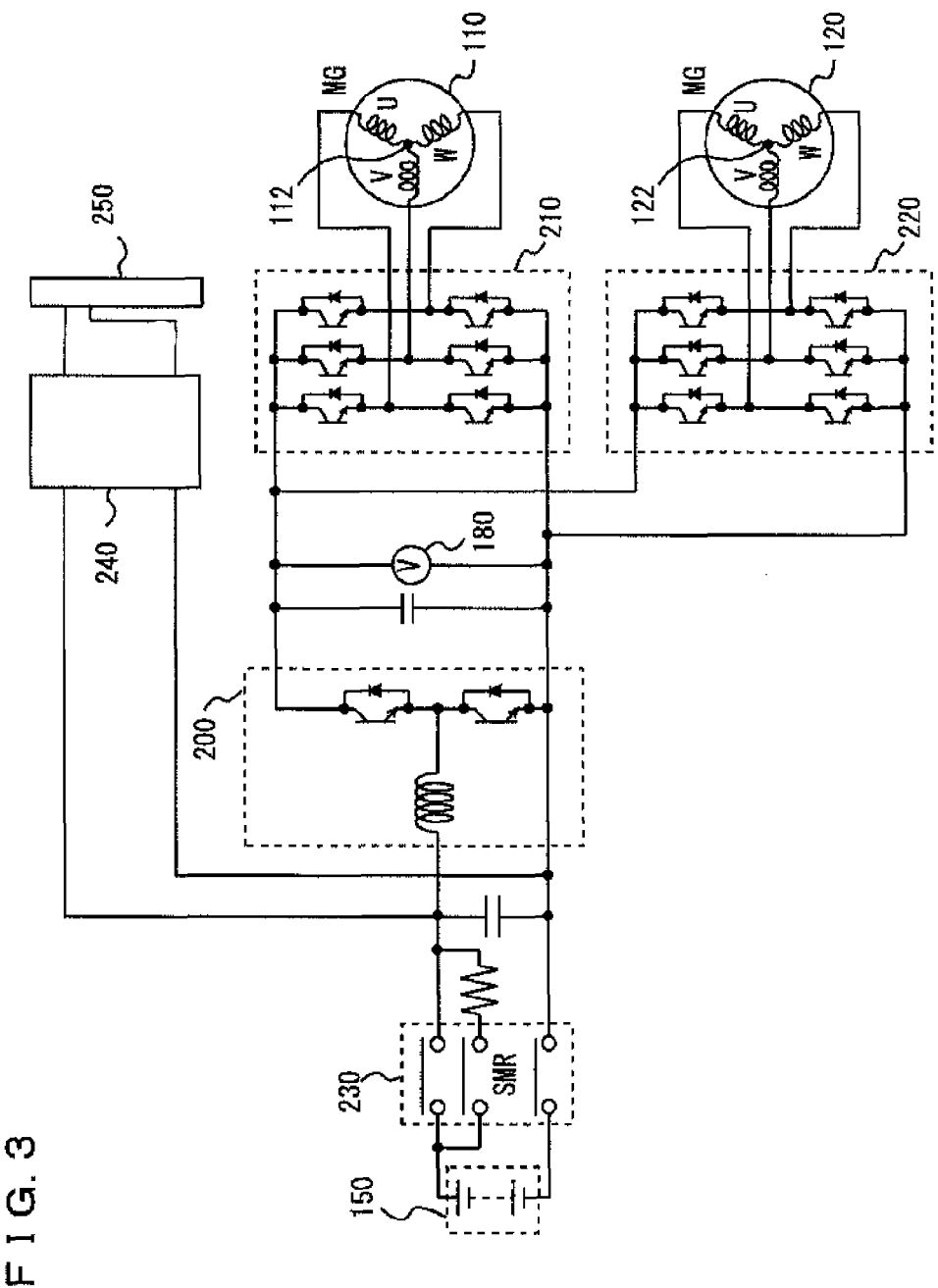
FIG. 3 is a (first) diagram illustrating an electric system of the plug-in hybrid vehicle.

Since engine 100, first motor generator 110 and second motor generator 120 are coupled to one another via power split device 130 formed of the planetary gear, the rotation speeds of engine 100, first motor generator 110 and second motor generator 120 are related in such a manner that they are connected by a straight line in a nomographic chart as shown in FIG. 3.

Referring back to FIG. 1, battery stack 150 serves as a battery set having a configuration in which a plurality of battery modules each having a plurality of battery cells integrated with each other are connected in series. Battery 150 has a voltage of about 200 V, for example. Battery 150 is charged with the electric power supplied from first motor generator 110 and second motor generator 120, as well as from a power supply outside the vehicle. A capacitor may be used instead of or in addition to battery 150.

Referring to FIG. 3, the electric system of the plug-in hybrid vehicle will be described further. The plug-in hybrid vehicle is provided with a converter 200, a first inverter 210, a second inverter 220, an SMR (System Main Relay) 230, a charger 240, and an inlet 250.

Converter 200 includes a reactor, two npn-type transistors, and two diodes. The reactor has its one end connected to the positive terminal side of each battery, and the other end connected to a connection point between the two npn-type transistors.

The two npn-type transistors are connected in series. The npn-type transistors are controlled by ECU 170. Diodes are respectively connected between the collector and the emitter of the respective npn-type transistors to allow a current flow from the emitter to the collector.

The npn-type transistors may be implemented by IGBTs (Insulated Gate Bipolar Transistors), for example. Instead of the npn-type transistors, power switching elements such as power MOSFETs (Metal Oxide Semiconductor Field-Effect Transistors) can be used.

When electric power discharged from battery 150 is supplied to first motor generator 110 or second motor generator 120, converter 200 boosts the voltage. In contrast, when electric power generated by first motor generator 110 or second motor generator 120 is charged into battery 150, converter 200 lowers the voltage.

A system voltage VH between converter 200 and the respective inverters is detected by a voltage sensor 180. The detection result from voltage sensor 180 is sent to ECU 170.

First inverter 210 includes a U-phase arm, a V-phase arm and a W-phase arm. The U-phase arm, V-phase arm and W-phase arm are connected in parallel. Each of the U-phase arm, V-phase arm and W-phase arm has two npn-type transistors connected in series. Diodes are respectively connected between the collector and the emitter of the respective npn-type transistors to allow a current flow from the emitter to the collector. A connection point of the npn-type transistors in each arm is connected to an end of each coil of first motor generator 110 other than a neutral point 112.

First inverter 210 converts a direct current supplied from battery 150 into an alternating current for supply to first motor generator 110. First inverter 210 also converts an alternating current generated by first motor generator 110 into a direct current.

Second inverter 220 includes a U-phase arm, a V-phase arm and a W-phase arm. The U-phase arm, V-phase arm and W-phase arm are connected in parallel. Each of the U-phase arm, V-phase arm and W-phase arm has two npn-type transistors connected in series. Diodes are respectively connected between the collector and the emitter of the respective npn-type transistors to allow a current flow from the emitter to the collector. A connection point of the npn-type transistors in each arm is connected to an end of each coil of second motor generator 120 other than a neutral point 122.

Second inverter 220 converts a direct current supplied from battery 150 into an alternating current for supply to second motor generator 120. Second inverter 220 also converts an alternating current generated by second motor generator 120 into a direct current.

Converter 200, first inverter 210 and second inverter 220 are controlled by ECU 170.

SMR 230 is provided between battery 150 and charger 240. SMR 230 is a relay for switching between a state in which battery 150 and the electrical system are connected to each other and a state in which they are disconnected from each other. When SMR 230 is opened, battery 150 is disconnected from the electrical system. When SMR 230 is closed, battery 150 is connected to the electrical system.

Namely, when SMR 230 is opened, battery 150 is electrically disconnected from converter 200, charger 240 and the like. When SMR 230 is closed, battery 150 is electrically connected to converter 200, charger 240 and the like.

The state of SMR 230 is controlled by ECU 170. For example, when ECU 170 is activated, SMR 230 is closed. When ECU 170 stops, SMR 230 is opened.

Figure 4:
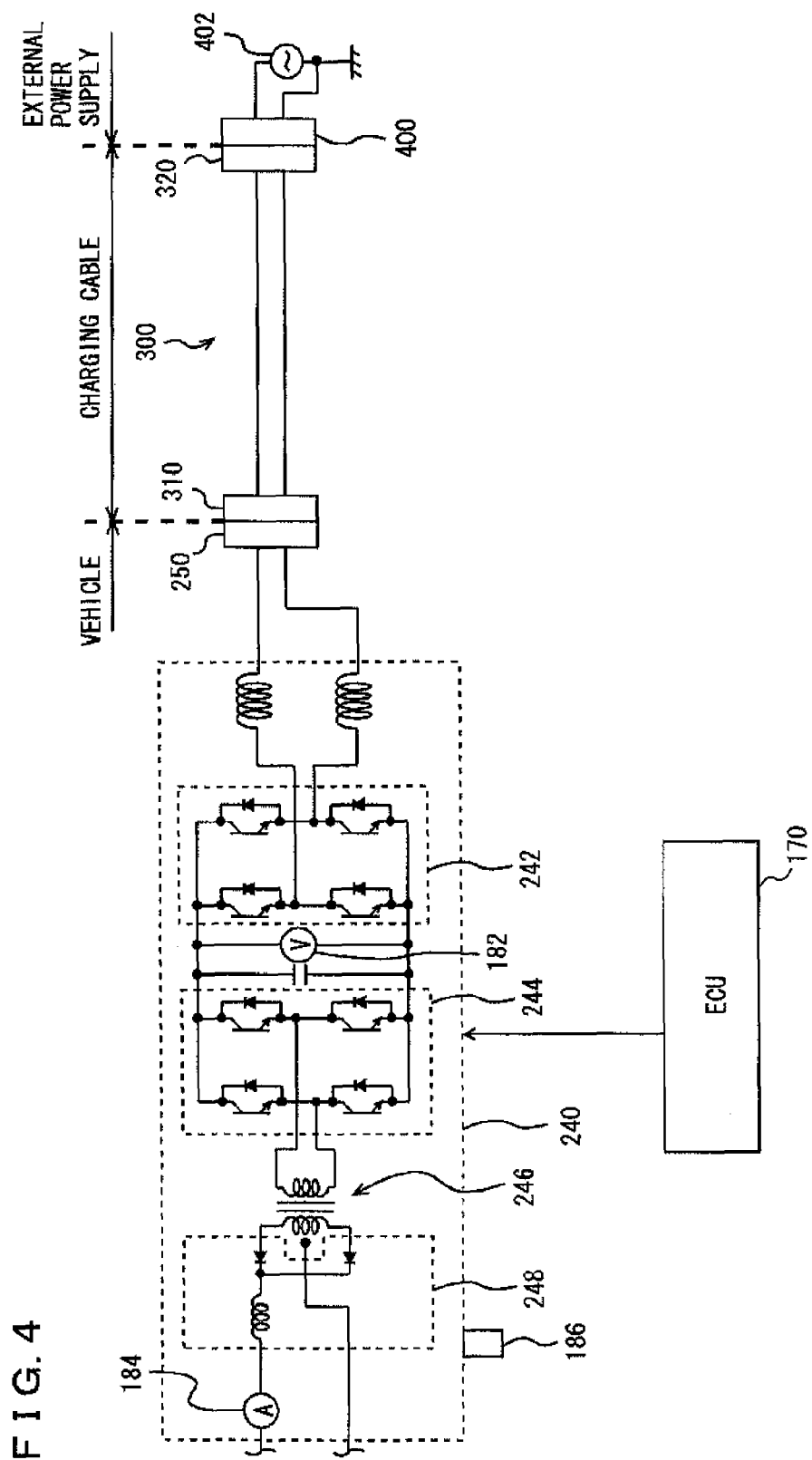
FIG. 4 is a (second) diagram illustrating the electric system of the plug-in hybrid vehicle.

Charger 240 is connected between battery 150 and converter 200. As shown in FIG. 4, charger 240 includes an AC/DC conversion circuit 242, a DC/AC conversion circuit 244, an insulation transformer 246, and a rectifier circuit 248.

AC/DC conversion circuit 242 is formed of a single-phase bridge circuit. AC/DC conversion circuit 242 converts alternating-current power into direct-current power based on a driving signal from ECU 170. AC/DC conversion circuit 242 also serves as a boost chopper circuit that boosts the voltage by using the coils as the reactor.

DC/AC conversion circuit 244 is formed of a single-phase bridge circuit. DC/AC conversion circuit 244 converts direct-current power into high frequency alternating-current power for output to insulation transformer 246, based on a driving signal from ECU 170.

Insulation transformer 246 includes a core made of a magnetic material, and a primary coil and a secondary coil wound around the coil. The primary coil and secondary coil are electrically insulated, and connected to DC/AC conversion circuit 244 and rectifier circuit 248, respectively. Insulation transformer 246 converts the high frequency alternating-current power received from DC/AC conversion circuit 244 to assume a voltage level in accordance with a turn ratio of the primary coil and the secondary coil for output to rectifier circuit 248. Rectifier circuit 248 rectifies the alternating-current power received from insulation transformer 246 into direct-current power.

A voltage between AC/DC conversion circuit 242 and DC/AC conversion circuit 244 (a voltage across terminals of a smoothing capacitor) is detected by a voltage sensor 182, and a signal indicating the detection result is input to ECU 170. An output current from charger 240 is detected by a current sensor 184, and a signal indicating the detection result is input to ECU 170. Further, a temperature of charger 240 is detected by a temperature sensor 186, and a signal indicating the detection result is input to ECU 170.

Inlet 250 is provided on a side face of the plug-in hybrid vehicle, for example. A connector 310 of a charging cable 300 coupling the plug-in hybrid vehicle and an external power supply 402 is connected to inlet 250.

A plug 320 of charging cable 300 is connected to an outlet 400 provided at a house. Alternating-current power is supplied from power supply 402 outside the plug-in hybrid vehicle to outlet 400.

The electric power supplied from external power supply 402 is charged into battery 150 with the plug-in hybrid vehicle and external power supply 402 being coupled to each other by charging cable 300. During charging of battery 150, SMR 230 is closed.

Figure 5:
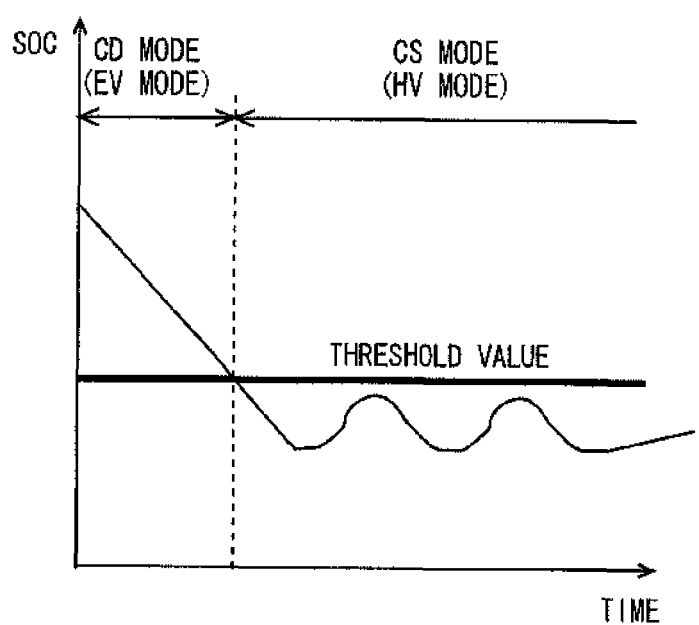
FIG. 5 illustrates an area where a CS mode is selected and an area where a CD mode is selected.

The CS mode and the CD mode will now be described further. As described above, the selection between the CS mode and the CD mode is determined by the driver operating switch 172. The selection between the CS mode and the CD mode may be determined by ECU 170. As shown in FIG. 5, for example, the CS mode may be selected when the SOC of battery 150 is equal to or lower than a threshold value. The CD mode may be selected when the SOC of battery 150 is higher than the threshold value.

More specifically, the CS mode may be selected when the SOC of battery 150 is equal to or lower than the threshold value, or when the electric system of the plug-in hybrid vehicle was stopped last time in the CS mode.

The CD mode may be selected when the SOC of battery 150 is higher than the threshold value, with a history of charging of battery 150 by power supply 402 outside the plug-in hybrid vehicle, or when the SOC of battery 150 is higher than the threshold value, and the electric system of the plug-in hybrid vehicle was stopped last time in the CD mode. Since charging of battery 150 is controlled by ECU 170, the presence or absence of the history of charging of battery 150 by power supply 402 outside the plug-in hybrid vehicle is determined within ECU 170 using a flag, for example. A method of selecting between the CS mode and the CD mode is not limited as such.

In the CS mode and the CD mode, the plug-in hybrid vehicle runs with a driving force from at least one of engine 100 and second motor generator 120.

Figure 6:
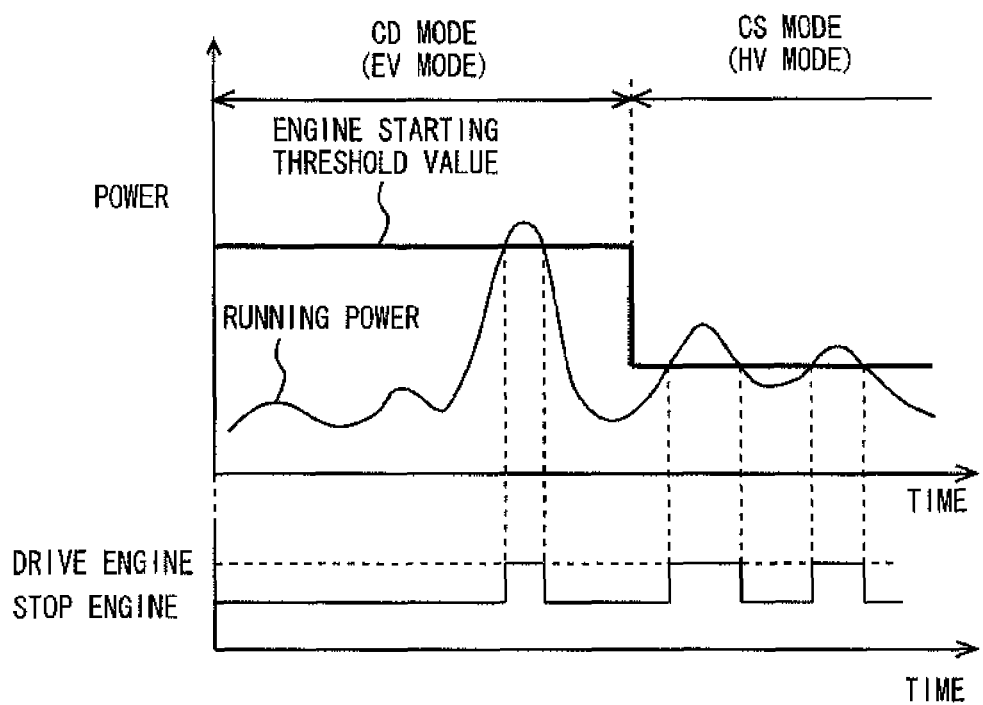
FIG. 6 illustrates a period of time during which an engine is driven.

As shown in FIG. 6, when running power of the plug-in hybrid vehicle is lower than an engine starting threshold value, the plug-in hybrid vehicle runs with only a driving force from second motor generator 120. Thus, when the running power equal to or higher than the engine starting threshold value decreases to the engine starting threshold value, ignition and fuel supply (fuel injection) to engine 100 is stopped in order to stop engine 100.

When the running power of the plug-in hybrid vehicle becomes equal to or higher than the engine starting threshold value, on the other hand, engine 100 is driven. The plug-in hybrid vehicle thus runs with a driving force from engine 100 in addition to or instead of the driving force from second motor generator 120. In addition, electric power generated by first motor generator 110 with the driving force from engine 100 is directly supplied to second motor generator 120.

As is clear from FIG. 6, an area where the plug-in hybrid vehicle is controlled in the CS mode includes an area where engine 100 is stopped and an area where engine 100 is driven. Likewise, an area where the plug-in hybrid vehicle is controlled in the CD mode includes an area where engine 100 is stopped and an area where engine 100 is driven.

The running power is calculated by ECU 170 in accordance with a map having the position of an accelerator pedal operated by the driver (accelerator pedal position), the vehicle speed and the like as parameters, for example. A method of calculating the running power is not limited as such.

In the present embodiment, the running power is used as a parameter of the plug-in hybrid vehicle which is determined in accordance with operation by the driver. Alternatively, the torque, acceleration, driving force, accelerator pedal position and the like may be used as parameters of the plug-in hybrid vehicle.

The engine starting threshold value in the CD mode is higher than the engine starting threshold value in the CS mode. That is, the area where engine 100 is stopped and the plug-in hybrid vehicle runs with only a driving force from second motor generator 120 in the CD mode is larger than the area where engine 100 is stopped and the plug-in hybrid vehicle runs with only a driving force from second motor generator 120 in the CS mode. In the CD mode, therefore, the plug-in hybrid vehicle is controlled such that engine 100 is stopped and the vehicle runs mainly with only a driving force from second motor generator 120. Engine 100 is driven more frequently in the CS mode than in the CD mode. In the CS mode, therefore, the plug-in hybrid vehicle is controlled to run efficiently using both engine 100 and second motor generator 120.

The engine starting threshold value in the CS mode may hereinafter also be referred to as first engine starting power. The engine starting threshold value in the CD mode may also be referred to as second engine starting power. As shown in FIG. 6, the second engine starting power is higher than the first engine starting power.

Electric power charged into battery 150 in the CD mode is lower than electric power charged into battery 150 in the CS mode. Specifically, in the CS mode, the charging power to battery 150 is determined in accordance with the SOC of battery 150. Engine 100 is driven so that electric power corresponding to the determined charging power can be generated with first motor generator 110. In the CD mode, on the other hand, the charging power to battery 150 is usually set to zero. That is, in the CD mode, although electric power obtained by regenerative braking is charged into battery 150, engine 100 is not driven for charging battery 150.

In the CD mode, therefore, the electric power stored in battery 150, particularly the electric power supplied from power supply 402 outside the plug-in hybrid vehicle is actively consumed. Thus, in the CD mode, ignition and fuel supply (fuel injection) to engine 100 may be stopped more frequently than in the CS mode in order to stop engine 100. That is, opportunity for operation of engine 100 is limited in the CD mode compared to in the CS mode.

As is well known, when engine 100 is started before the completion of warm-up, a relatively high amount of HC or CO may be exhausted. In order to reduce emissions of HC or CO, as shown in FIG. 7, in the CS mode, the temperature of catalyst 102 is increased to be equal to or higher than the prescribed activating temperature. The temperature of catalyst 102 is increased to be equal to or higher than the activating temperature by, for example, operating engine 100 and performing catalyst warm-up control including ignition retard of engine 100 during a period between times T1 and T2 in FIG. 7.

On the other hand, when the CD mode is selected at time T3 by the driver operating switch 172 during control of engine 100 in the CS mode, the temperature of catalyst 102 is increased to be higher than the prescribed activating temperature. For example, the temperature of catalyst 102 is increased to be equal to or higher than a specific temperature that is set to be higher than the activating temperature. The temperature of catalyst 102 may be increased only for a prescribed period of time. After the temperature of catalyst 102 is increased to be higher than the prescribed activating temperature, the control mode of engine 100 is changed from the CS mode to the CD mode at time T4.

Where the control mode is selected depending on the SOC of battery 150, when the SOC of battery 150 exceeds the threshold value during control of engine 100 in the CS mode, the temperature of catalyst 102 may be increased to be higher than the prescribed activating temperature, and then the control mode of engine 100 may be changed from the CS mode to the CD mode.

In this way, the temperature of catalyst 102 is increased to be higher than the activating temperature before transfer from the CS mode to the CD mode. Therefore, even in the CD mode in which the temperature of catalyst 102 easily decreases due to limited operation of engine 100, the temperature of catalyst 102 can be maintained higher than the activating temperature for a long period of time. Thus, the state in which catalyst 102 is warmed-up is maintained.

Figure 8:
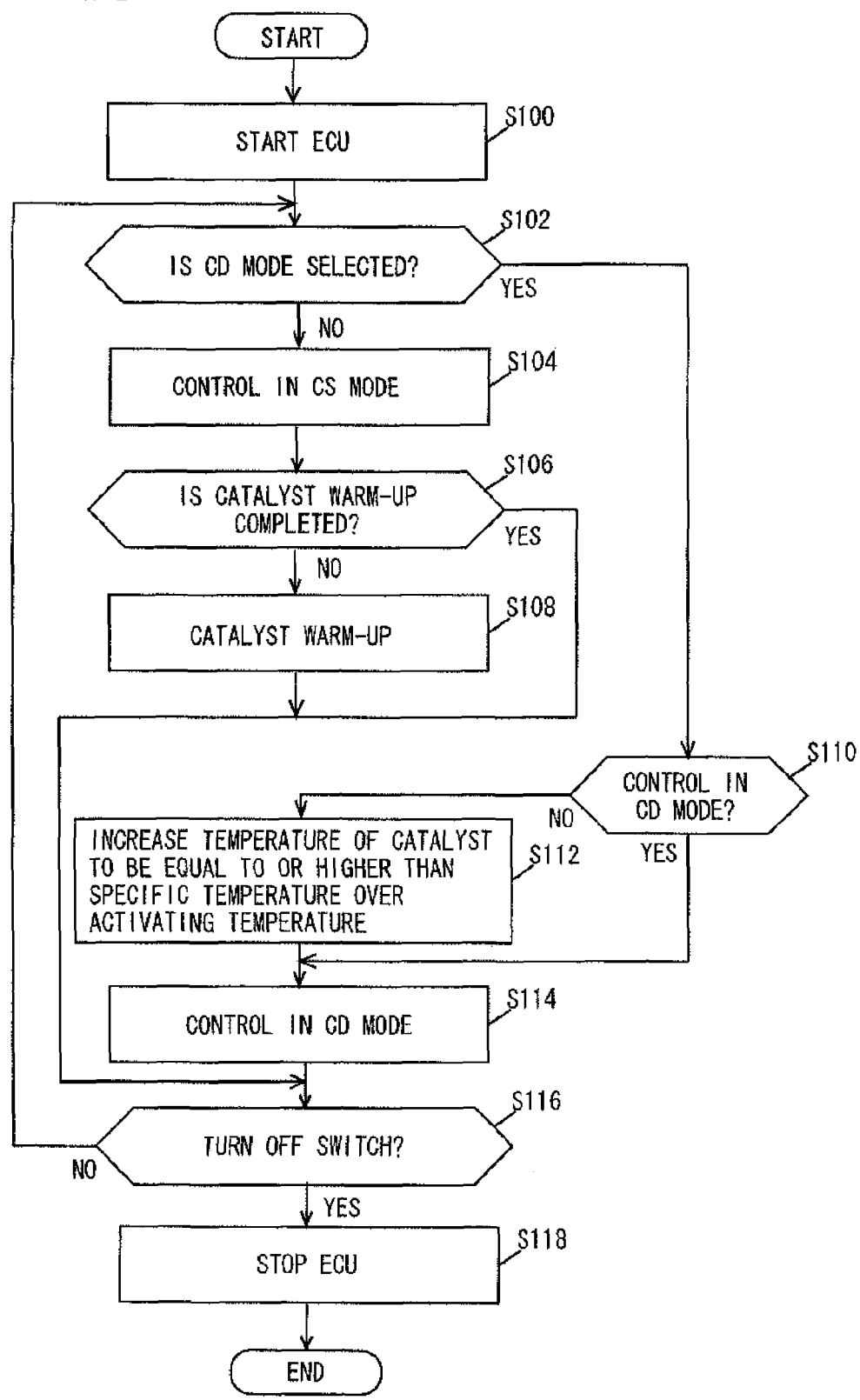
FIG. 8 is a flow chart illustrating a process executed by an ECU.

Referring to FIG. 8, a process executed by ECU 170 will be described. The process described below is executed by software, hardware, or cooperation between software and hardware.

When ECU 170 is activated in step (hereinafter abbreviated as S) 100, it is determined in step S102 whether the CD mode is selected by operation of switch 172 or not. Where the control mode is selected depending on the SOC, it may be determined whether the SCO of battery 150 is greater than the threshold value or not, instead of determining whether the CD mode is selected by operation of switch 172 or not. When the CD mode is not selected (NO in S102), the plug-in hybrid vehicle is controlled in the CS mode in S104. Engine 100 is therefore controlled in the CS mode.

It is then determined in S106 whether warm-up of catalyst 102 is completed or not. That is, it is determined whether the temperature of catalyst 102 is equal to or higher than the prescribed activating temperature or not. Whether the warm-up of catalyst 102 is completed or not may be determined using a well-known technique, for example, by calculation from an integrated amount of intake air, or by providing a sensor for measuring the temperature of the warmed-up catalyst. Therefore, a detailed description thereof is not repeated herein.

If the warm-up of catalyst 102 is not completed (NO in S106), the catalyst warm-up control is executed in S108. Thus, engine 100 is operated and ignition timing is retarded, thereby increasing the temperature of catalyst 102 to be equal to or higher than the activating temperature.

If an ignition switch or a start switch is not turned off, for example (NO in S116), it is determined again whether the CD mode is selected or not (S102).

Where the CD mode is selected (YES in S102), it is determined in S110 whether the plug-in hybrid vehicle is being controlled in the CD mode or not.

When the CD mode is selected while the plug-in hybrid vehicle is controlled in the CS mode (YES in S102, or NO in S110), the temperature of catalyst 102 is increased to be equal to or higher than a predetermined temperature that is set to be higher than the activating temperature in S112. Then in S114, the control mode is changed from the CS mode to the CD mode.

Where the ignition switch or start switch is turned off, for example (YES in S116), ECU170 stops.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

100 engine; 102 catalyst; 110 first motor generator; 120 second motor generator; 130: power split device; 140 reduction gear; 150 battery; 160 front wheel; 170 ECU

The invention claimed is:

1. A vehicle provided with an electric motor as a driving source, comprising:
    an engine;
    a catalyst that purifies gas exhausted from said engine; and
    a control unit that controls said engine in a control mode being one of a first control mode and a second control mode in which opportunity for operation of said engine is limited compared to in said first control mode, and increases a temperature of said catalyst to be equal to or higher than a prescribed temperature in said first control mode, wherein
    said control unit changes said control mode from said first control mode to said second control mode, after increasing the temperature of said catalyst to be higher than said prescribed temperature,
    sets a parameter of said vehicle in accordance with operation by a driver,
    stops said engine when said parameter is smaller than a predetermined first value and operates said engine when said parameter is equal to or greater than said predetermined first value in said first control mode, and
    stops said engine when said parameter is smaller than a predetermined second value greater than said predetermined first value and operates said engine when said parameter is equal to or greater than said predetermined second value in said second control mode.

2. The vehicle according to claim 1, wherein
    said control unit controls said engine in said first control mode when a state of charge of a power storage device is lower than a threshold value, and when the state of charge of said power storage device exceeds said threshold value during control of said engine in said first control mode, said control unit increases the temperature of said catalyst to be higher than said prescribed temperature, and then changes said control mode from said first control mode to said second control mode.

3. The vehicle according to claim 1, wherein
    said control unit changes said control mode from said first control mode to said second control mode after increasing the temperature of said catalyst to be equal to or higher than a temperature higher than said prescribed temperature.

4. The vehicle according to claim 1, wherein said parameter is power.

5. A method for controlling a vehicle provided with an electric motor as a driving source, an engine, and a catalyst that purifies gas exhausted from said engine, said engine being controlled in a control mode being one of a first control mode and a second control mode in which opportunity for operation of said engine is limited compared to in said first control mode, said method comprising the steps of:
    increasing a temperature of said catalyst to be equal to or higher than a prescribed temperature in said first control mode;
    changing said control mode from said first control mode to said second control mode after the temperature of said catalyst is increased to be higher than said prescribed temperature;
    setting a parameter of said vehicle in accordance with operation by a driver;
    stopping said engine when said parameter is smaller than a predetermined first value and operating said engine when said parameter is equal to or greater than said predetermined first value in said first control mode; and
    stopping said engine when said parameter is smaller than a predetermined second value greater than said predetermined first value and operating said engine when said parameter is equal to or greater than said predetermined second value in said second control mode.

6. A device for controlling a vehicle provided with an electric motor as a driving source, an engine, and a catalyst for purifying gas exhausted from said engine, comprising:
    means for controlling said engine in a control mode being one of a first control mode and a second control mode in which opportunity for operation of said engine is limited compared to in said first control mode;

means for increasing a temperature of said catalyst to be equal to or higher than a prescribed temperature in said first control mode;

means for changing said control mode from said first control mode to said second control mode after the temperature of said catalyst is increased to be higher than said prescribed temperature;

means for setting a parameter of said vehicle in accordance with operation by a driver;

means for stopping said engine when said parameter is smaller than a predetermined first value and operating said engine when said parameter is equal to or greater than said predetermined first value in said first control mode; and means for stopping said engine when said parameter is smaller than a predetermined second value greater than said predetermined first value and operating said engine when said parameter is equal to or greater than said predetermined second value in said second control mode.

* * * * *